(12) United States Patent
Weiler et al.

(10) Patent No.: US 7,548,900 B2
(45) Date of Patent: Jun. 16, 2009

(54) SYSTEMS AND METHODS FOR DATA MANAGEMENT

(75) Inventors: Thomas Weiler, Saarlouis (DE); Melanie Adt, Eppelborn (DE); Martina Wingert, Eppelborn (DE); Roman Spohn, Hermeskeil (DE)

(73) Assignee: SAP AG, Walldorf (DE)

( * ) Notice: Subject to any disclaimer, the term of this patent is extended or adjusted under 35 U.S.C. 154(b) by 160 days.

(21) Appl. No.: 11/606,124

(22) Filed: Nov. 30, 2006

(65) Prior Publication Data

US 2008/0133478 A1     Jun. 5, 2008

(51) Int. Cl.
*G06F 7/00* (2006.01)
(52) U.S. Cl. .......................................... 707/1
(58) Field of Classification Search ................. 707/1–10
See application file for complete search history.

(56) References Cited

U.S. PATENT DOCUMENTS

| | | | |
|---|---|---|---|
| 4,752,877 A | 6/1988 | Roberts et al. |
| 5,315,508 A | 5/1994 | Bain et al. |
| 5,400,253 A | 3/1995 | O'Connor |
| 5,444,820 A | 8/1995 | Tzes et al. |
| 5,546,507 A | 8/1996 | Staub |
| 5,615,109 A | 3/1997 | Eder |
| 5,701,400 A | 12/1997 | Amado |
| 5,758,327 A | 5/1998 | Gardner et al. |
| 5,870,716 A | 2/1999 | Sugiyama et al. |
| 5,930,771 A | 7/1999 | Stapp |
| 5,999,914 A | 12/1999 | Blinn et al. |
| 6,029,139 A | 2/2000 | Cunningham et al. |
| 6,064,984 A | 5/2000 | Ferguson et al. |
| 6,260,024 B1 | 7/2001 | Shkedy |
| 6,341,351 B1 | 1/2002 | Muralidhran et al. |
| 6,405,181 B2 | 6/2002 | Lent et al. |
| 6,505,093 B1 | 1/2003 | Thatcher et al. |
| 6,507,851 B1 | 1/2003 | Fujiwara et al. |
| 6,701,299 B2 | 3/2004 | Kraisser et al. |
| 6,725,204 B1 | 4/2004 | Gusley |
| 6,868,528 B2 | 3/2005 | Roberts |
| 6,910,017 B1 | 6/2005 | Woo et al. |
| 6,980,966 B1 | 12/2005 | Sobrado et al. |
| 7,031,951 B2 | 4/2006 | Mancisidor et al. |
| 7,080,030 B2 | 7/2006 | Eglen et al. |

(Continued)

FOREIGN PATENT DOCUMENTS

JP     2004-030343 A     1/2004

(Continued)

OTHER PUBLICATIONS

U.S. Appl. No. 60/374,892, filed Apr. 22, 2002, Krajec.

(Continued)

*Primary Examiner*—Wilson Lee
(74) *Attorney, Agent, or Firm*—Foley & Lardner LLP

(57) ABSTRACT

A system, method and machine readable medium for the analysis and management of information is described. More specifically, the embodiments o relate to systems and methods for gathering, analyzing and reporting information in a business context. More specifically, the embodiments relate to systems and methods for presenting business metrics to system users in a reliable and efficient manner, including the employment of a data extractor and multiple data storage units arranged to generate reports.

20 Claims, 7 Drawing Sheets

U.S. PATENT DOCUMENTS

| | | |
|---|---|---|
| 7,082,408 B1 | 7/2006 | Baumann et al. |
| 7,092,929 B1 | 8/2006 | Dvorak et al. |
| 7,100,083 B2 | 8/2006 | Little et al. |
| 7,117,165 B1 | 10/2006 | Adams et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 7,275,048 B2 | 9/2007 | Bigus et al. |
| 2001/0019778 A1 | 9/2001 | Gardaz et al. |
| 2001/0032130 A1 | 10/2001 | Gabos et al. |
| 2001/0039517 A1 | 11/2001 | Kawakatsu |
| 2001/0049634 A1 | 12/2001 | Stewart |
| 2002/0013731 A1 | 1/2002 | Bright et al. |
| 2002/0023500 A1 | 2/2002 | Chikuan et al. |
| 2002/0026368 A1 | 2/2002 | Carter, III |
| 2002/0059108 A1 | 5/2002 | Okura et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0087389 A1* | 7/2002 | Sklarz et al. .................. 705/10 |
| 2002/0107713 A1 | 8/2002 | Hawkins |
| 2002/0116241 A1 | 8/2002 | Sandhu et al. |
| 2002/0123930 A1 | 9/2002 | Boyd et al. |
| 2002/0138290 A1 | 9/2002 | Metcalfe et al. |
| 2002/0147668 A1 | 10/2002 | Smith et al. |
| 2002/0152128 A1 | 10/2002 | Walch et al. |
| 2002/0184116 A1 | 12/2002 | Tam et al. |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0074269 A1 | 4/2003 | Viswanath |
| 2003/0126024 A1 | 7/2003 | Crampton et al. |
| 2003/0144916 A1 | 7/2003 | Mumm et al. |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0200150 A1 | 10/2003 | Westcott et al. |
| 2003/0208365 A1 | 11/2003 | Avery et al. |
| 2003/0229502 A1 | 12/2003 | Woo |
| 2004/0010463 A1 | 1/2004 | Hahn-Carlson et al. |
| 2004/0098358 A1 | 5/2004 | Roediger |
| 2004/0122689 A1 | 6/2004 | Dailey et al. |
| 2004/0162763 A1 | 8/2004 | Hoskin et al. |
| 2004/0172321 A1 | 9/2004 | Vemula et al. |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096963 A1 | 5/2005 | Myr et al. |
| 2005/0102175 A1 | 5/2005 | Dudat et al. |
| 2005/0102192 A1 | 5/2005 | Gerrits et al. |
| 2005/0102227 A1 | 5/2005 | Solonchev |
| 2005/0165659 A1 | 7/2005 | Gruber |
| 2005/0171825 A1 | 8/2005 | Denton et al. |
| 2006/0020512 A1 | 1/2006 | Lucas et al. |
| 2006/0036507 A1 | 2/2006 | Pujar et al. |
| 2006/0112099 A1 | 5/2006 | Musgrove et al. |
| 2007/0050272 A1 | 3/2007 | Godlewski et al. |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

Abraham et al., "An Implemented System For Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NRF 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

* cited by examiner

FIGURE 7

| Article No | Location | Quantity | Record No | Day | MAP Criterion |
|---|---|---|---|---|---|
| J100 | A | 100 | 101771 | 10.10.2006 | $0.36 |
| J100 | B | 50 | 101772 | 10.10.2006 | $0.36 |
| J105 | B | 200 | 101773 | 10.10.2006 | $0.50 |
| J104 | C | 210 | 101774 | 10.10.2006 | $0.36 |

SYSTEMS AND METHODS FOR DATA MANAGEMENT

BACKGROUND

The present application relates generally to the field of the analysis and management of information. More specifically, exemplary embodiments relate to systems and methods for gathering, analyzing and reporting information in a business context. More specifically, certain exemplary embodiments relate to systems and methods for presenting business metrics to system users in a reliable and efficient manner.

There have been developed over the past several decades software and hardware based systems for monitoring and administering business processes. These processes can include all aspects of a business, including inventory and supply chain management, business financing, personnel management, etc. These systems are sometimes called enterprise resource planning systems. Information generated and stored by enterprise resource planning systems can be extremely useful as "business intelligence". It has been a task of business systems designers to help the right information be provided to the right people at the right time.

A business system may provide different metrics to a system user, which may also be called "aggregate data". One example of such a metric involves the moving average price of products used by a business. If the moving average price of a business raw material exceeds a certain price, for example, it may be indicative of supply problems. The moving average price is also used for inventory revaluation. There is thus a need to develop systems and methods for evaluating the moving average price and other business metrics in a reliable and efficient fashion. There is further a need to recognize exceptional deviations from the standard business metrics and to quickly identify the underlying data that led to the deviation condition.

SUMMARY OF THE INVENTION

One aspect of the embodiments relates to a system for monitoring a data metric, comprising: a plurality of records relating to a data metric; a database for storing at least a portion of information from at least one of the plurality of records relating to a data metric; an extractor for querying the database for database data relevant to the data metric within a particular time frame and providing query results to a first data storage unit and a second data storage unit; wherein the first and second data storage units are used to generate first and second reports regarding the data metric.

A second aspect of the embodiments relates to a method for allowing monitoring of a data metric, comprising: scanning a plurality of records to determine those related to a data metric; storing information from at least some of the plurality of records in a database; extracting via a query information from the database related to the data metric; providing the query information to a first data storage unit and a second data storage unit; generating a report using the first data storage unit; and generating a report using the second data storage unit.

Another aspect of the embodiments relates to a machine readable medium with executable program code embedded therein, the code when executed performing a method, comprising: scanning a plurality of records to determine those related to a data metric; storing information from at least some of the plurality of records in a database; extracting via a query information from the database related to the data metric; providing the query information to a first data storage unit and a second data storage unit; generating a report using the first data storage unit; and generating a report using the second data storage unit.

BRIEF DESCRIPTION OF THE DRAWINGS

FIG. 7 shows exemplary data statements of embodiments.

DETAILED DESCRIPTION OF THE PREFERRED EMBODIMENTS

Figure 1:
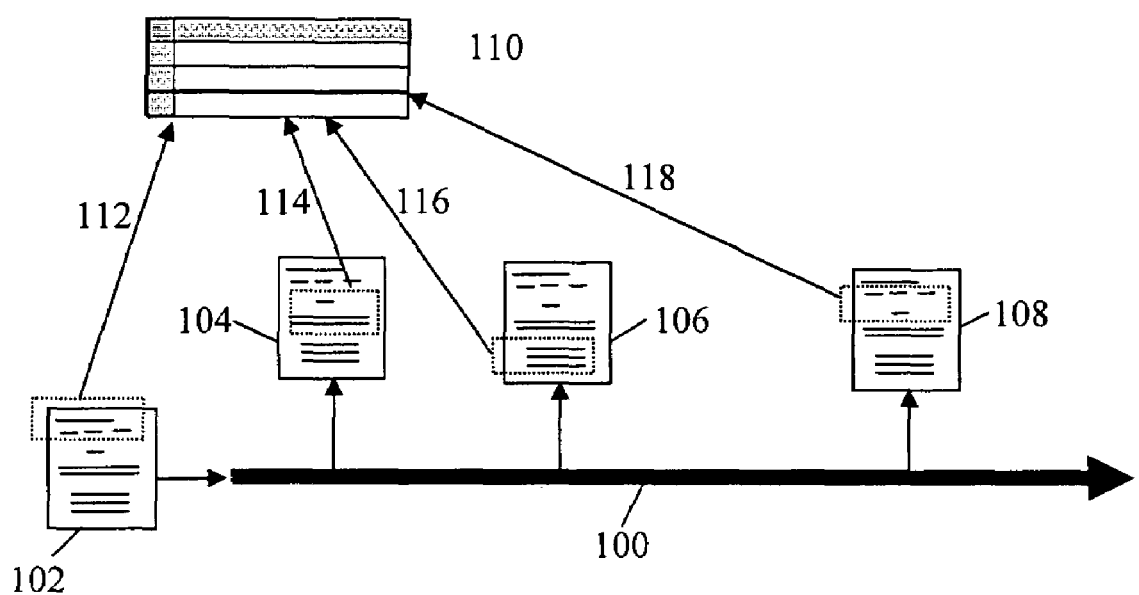
FIG. 1 depicts a business process.

The various embodiments of the invention will be described in further detail with reference to the Figures, of which FIG. 1 represents a business process as depicted by the arrow 100. Arrow 100 shows the process progressing in time. At various points in time, the process uses or generates records 102, 104, 106 and 108. Some of the records associated with a business process, and in FIG. 1 each of the records 102 through 108 has information which is relevant to a particular business metric, for example, the moving average price of a raw material. In FIG. 1, the relevant portions of the records are shown using dashed boxes. If the relevant portions of the records 102 through 108 are extracted (as shown in FIG. 1 with arrows 112, 114, 116 and 118), they can be stored in a manner 110 that will facilitate the reporting and recognition of trends in critical data for the business process.

Figure 2:
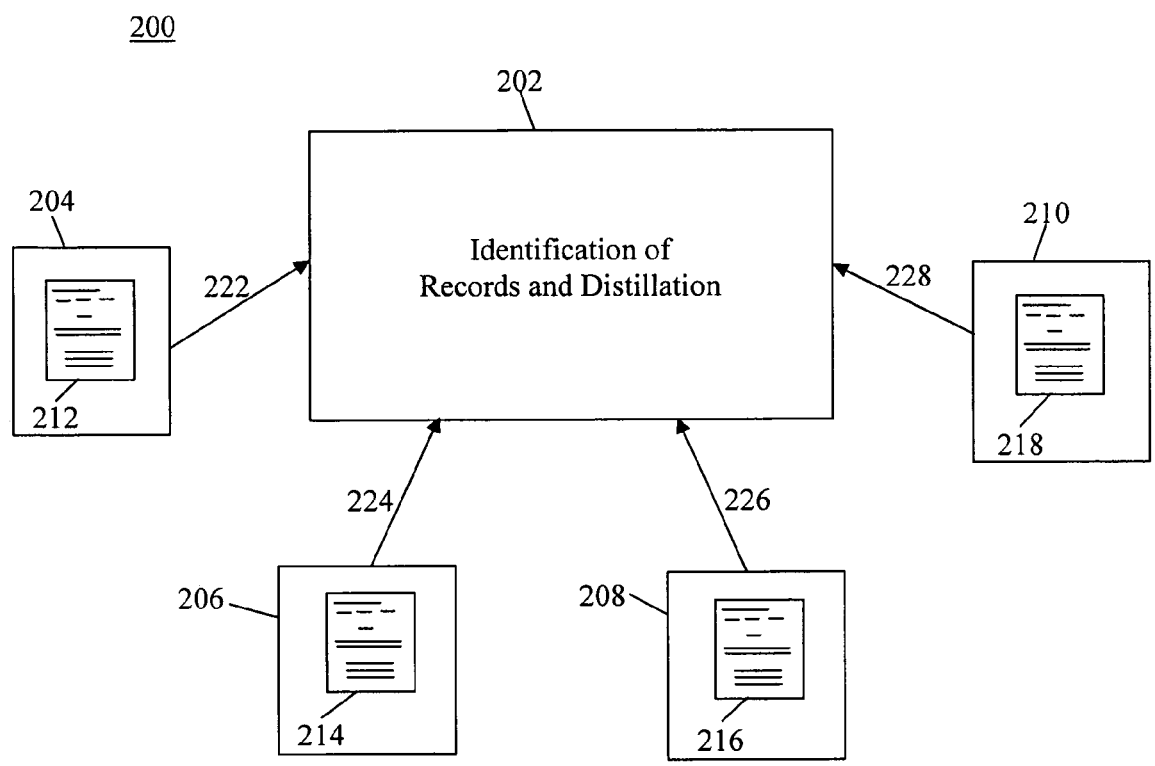
FIG. 2 depicts an enterprise resource planning part of a system as contemplated in an exemplary embodiment.

With reference to FIG. 2, a system 200 according to an embodiment is shown, which system accomplishes the objectives described above. The system 200 comprises an enterprise resource planning (ERP) system 202, for example as a software system available from SAP AG. The ERP system 202 is a system used to monitor and control financial, human resource, business and/or corporate processes. In a preferred embodiment, system 202 is implemented on a computing platform or a network of computing platforms.

The ERP system 202 exists within a business environment with various business units or installations 204, 206, 208 and 210. Each unit or installation generates or receives records 212, 214, 216, 218. The records may be invoices, sales records, records of inventory management, records of price changes, etc. Units 204, 206, 208, and 210 can be remote from each other or located near each other. Units 204, 206, 208 and 210 can be connected via a private or public computer network. Alternatively, units 204, 206, 208 and 210 are not connected and data can be collected by other means.

In order to monitor the progress of particular business metrics, for example the moving average price of a particular item, the ERP system 202 is equipped by means of a report to seek out those particular business records that are relevant to the particular metric. For example, for the calculation of a moving average price, an ERP system 202 might seek out inventory management records, sales price revaluation records, price change records and invoice records from among records 212 through 218. It should be understood that each business unit or installation 204 through 210 can generate a variety of different records.

Each relevant record is transmitted to the ERP system 202 as indicated by arrows 222, 224, 226 and 228. The record may be distilled into a data statement, comprising, by way of example, the date of the record, a record identifier that serves as a key, price and quantity data. The data statements are stored by the ERP, for example in a transparent database table.

Figure 3:
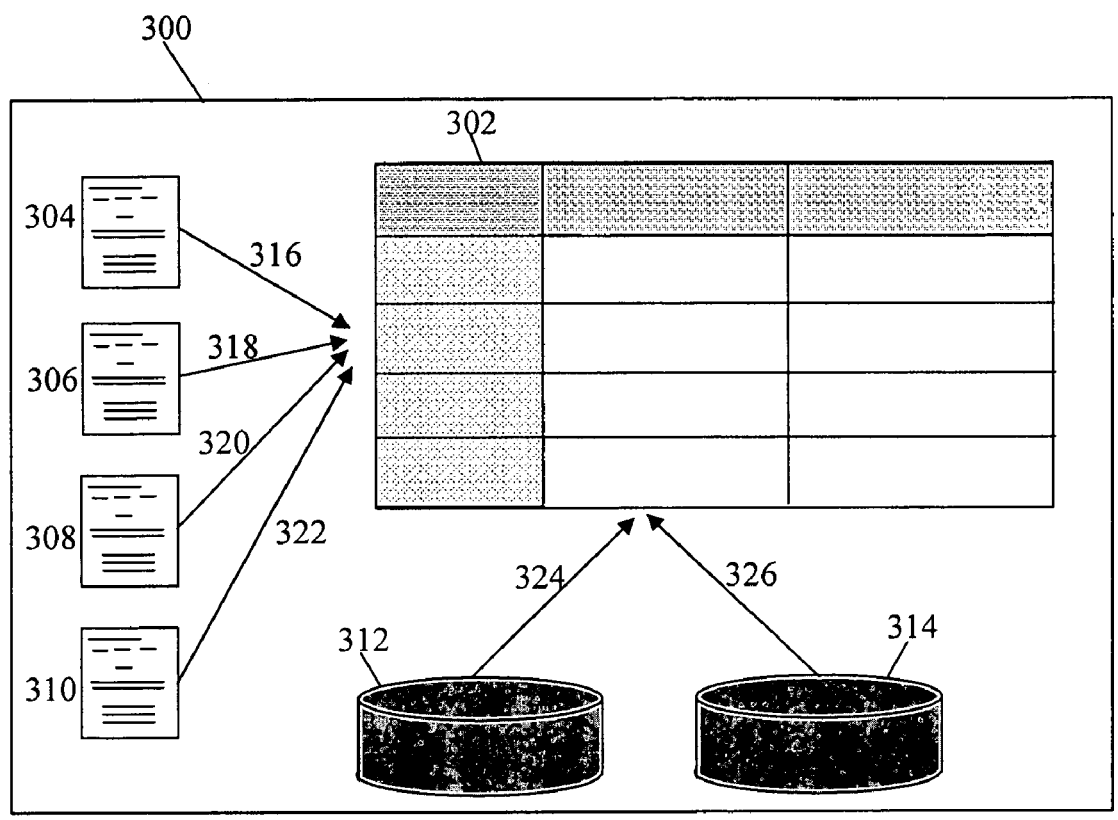
FIG. 3 depicts a reporting unit of enterprise resource planning part of a system as contemplated in an exemplary embodiment.

The distillation and storage of record information is shown in FIG. 3. FIG. 3 shows a report unit 300 of ERP system, which may be implemented as an executable program or a batch job. Report unit 300 has access to a transparent database table 302 having row entries further comprising data statements. It should be clear that any appropriate database structure may be used. At periodic intervals, for example, once per day, records 304, 306, 308 and 310 are sought out and distilled by the report 300 into data sentences as indicated by arrows 316, 318, 320 and 322, which indicate the flow of information into table 302, not into any particular row. The report also gathers relevant information regarding, for example from other relevant business information systems 312 and 314, which may be, for example, inventory management systems.

With the data obtained from records 304 through 310 and business information systems 312 and 314, the report 300 precalculates business metrics, for example, a moving average price of goods, as well as inventory quantities and inventory values. These are stored as part of the transparent table 302 accessible to the report. Each data sentence is also given a time-stamp.

Figure 4:
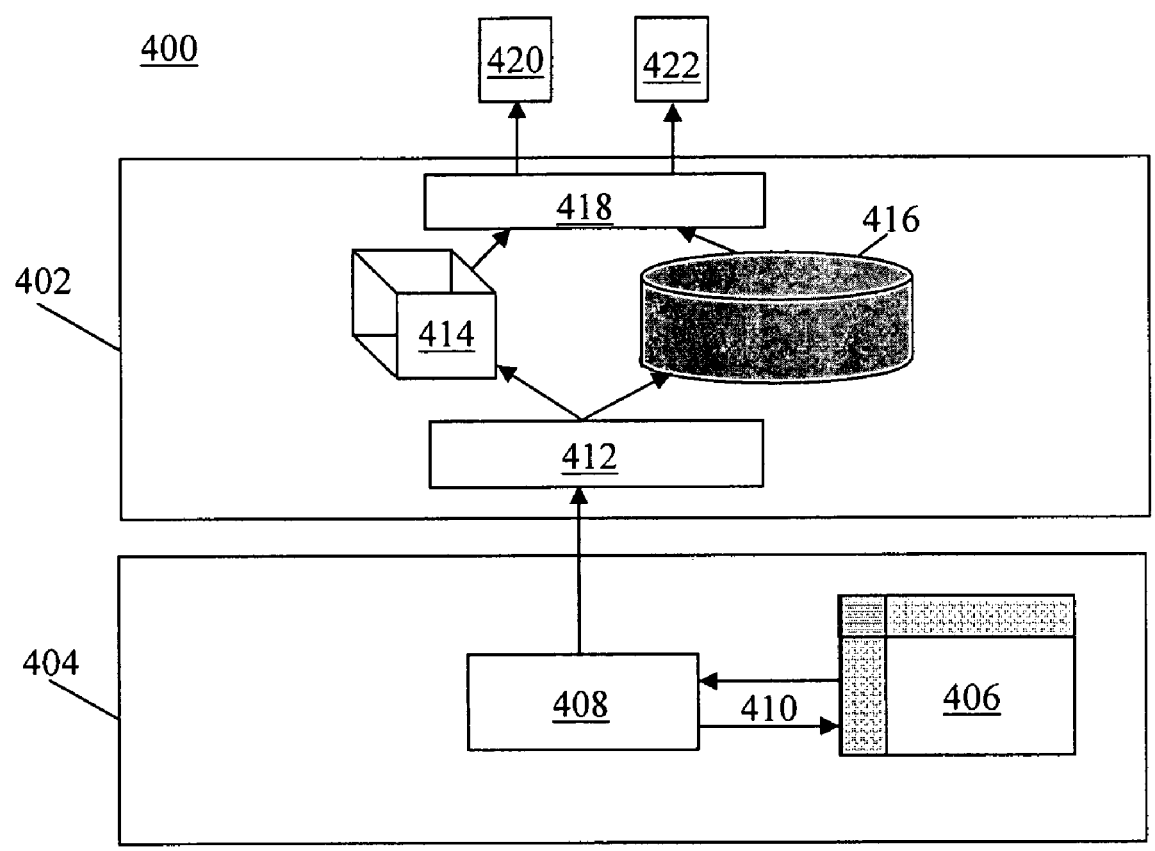
FIG. 4 depicts an overall system as contemplated in an exemplary embodiment.

With reference to FIG. 4, an overall business intelligence system 400 comprising an ERP system 404 and a business intelligence warehousing (BW) system 402, such as that offered by SAP AG, is depicted. The ERP system 404 further comprises a database table 406 that is used to store information generated by report 300. The table 406 may be the same as table 302, or it may be a different table. ERP system 404 also comprises an extractor application 408 that communicates, as shown by arrows 410, with table 406 to generate data statements relevant to a particular time period. The extractor 408 uses the time stamp provided to the data sentences in order to pass data statements to an information source 412, which can be, for example, an InfoSource as used by SAP AG.

InfoSource 412 acts as a data source within the BW system 402 to two data targets: InfoCube 414 and Operational Data Store (ODS) Object 416. The InfoCube 414 is a multi-dimensional database structure optimized for fast querying. InfoCube 414 holds only the data statements for which the target business metric exceeds a threshold value, or in the event of a minimum threshold, is below the minimum. For example, if the moving average price is the target metric, the InfoCube 414 will store only those data statements for which the moving average price for a particular product exceeds or, in the event of a minimum, is below a particular customer defined threshold. ODS Object 416, on the other hand stores detailed information, such that a more comprehensive analysis of the data can be performed when required by the customer.

InfoCube 414 and ODS object 416 are linked over an interface 418, the function of which is to bring together more than one data stream for the purpose of generating a report. The interface 418 may be, for example, a MultiProvider from the SAP AG.

In the detailed analysis ODS object 416, all data statements delivered by the Extractor are saved. Both data targets have as the lowest level of granularity Location/Article/Document Nr/Day. The Exception Reporting InfoCube 414 can be emptied as soon as the deviation is analyzed and no longer needed. The Detailed Analysis ODS object 416 should not be stored for longer than an appropriate period, for example two months. Then a new ODS Object should be constructed and, as soon as the information out of the previous ODS object 416 is no longer needed, it can be archived.

The BW system 402 generates two reports 420 and 422 for system users. The report 420 is an exception report, and represents a summary of all instances where the targeted business metric exceeded or, in the event of a minimum, was below the corresponding threshold. These are the "alert values" of the report 402. The data in report 402 also includes the most important documents which formed the basis for the alert values of the metric. For the case of a moving average price report, information about the corresponding inventory, the inventory values and the moving average price is also displayed. Report 422 represents a more detailed report based on all information provided by the ERP system 404, and displays material/location combinations.

Figure 5:
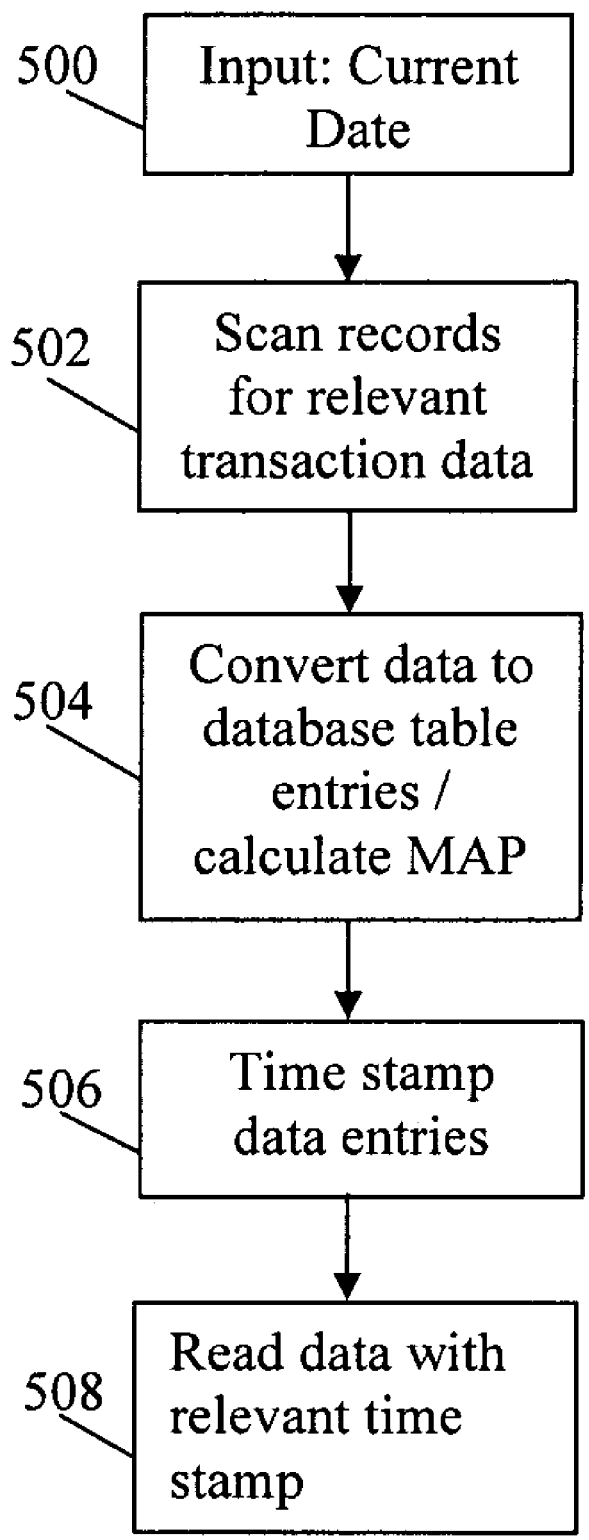
FIG. 5 is a flow chart showing the steps of part of a method embodiment.

FIG. 5 represents a flow chart of the reporting methods of an embodiment of the present invention. At step 500, the ERP system report receives as its input the current date. At step 502, the ERP system report scans system records for relevant transactional data. This data is distilled and converted to database table entries at step 504. Also at step 504, the report may precalculate the target business metric and other relevant information. Database entries are time stamped and the time stamp is recorded at step 506. The time stamp serves to identify an approximate record validity time frame. At step 508, data is read from the table according to its time stamp for further processing.

Figure 6:
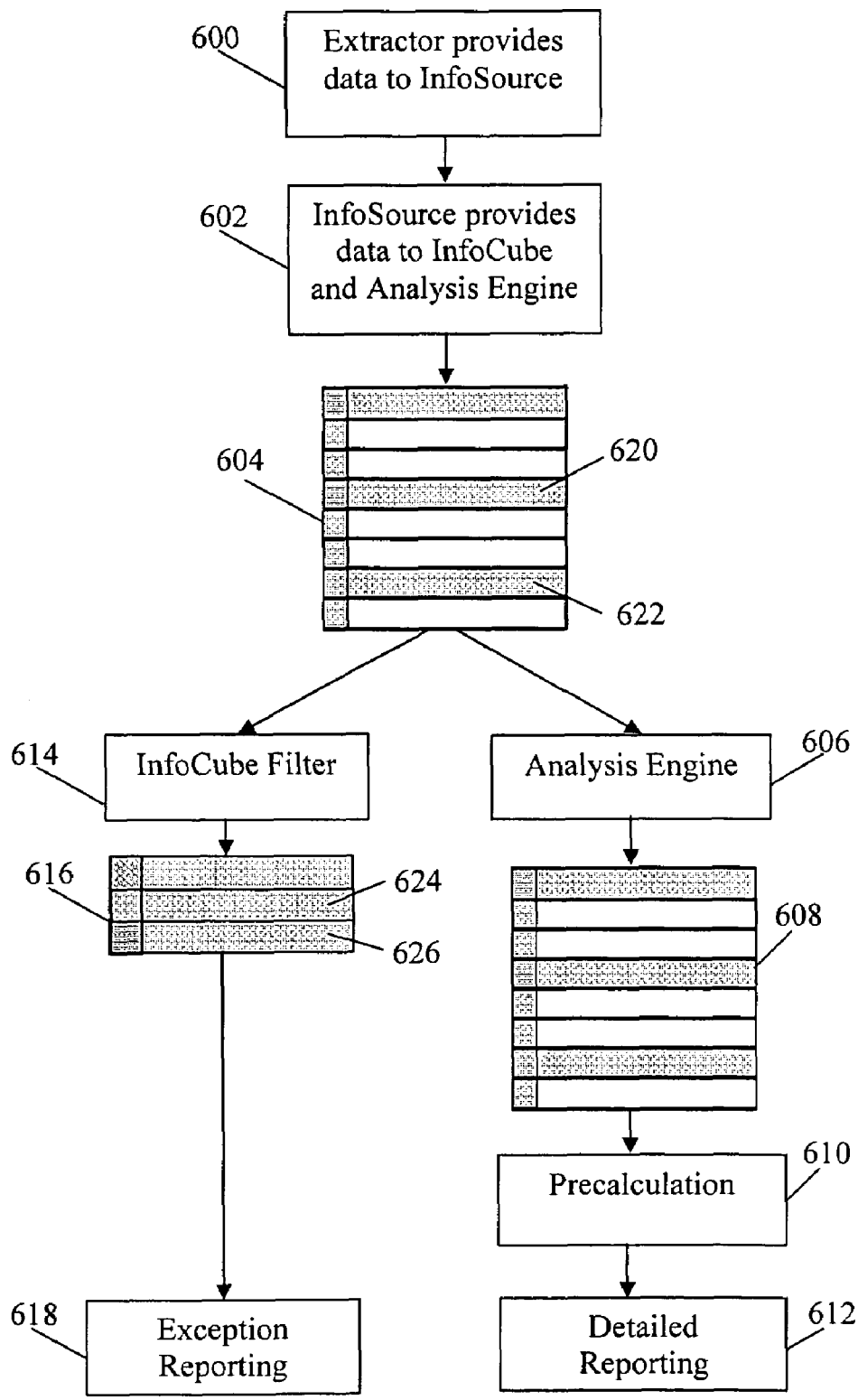
FIG. 6 is an information flow chart depicting information flow in method and system embodiments.

FIG. 6 represents the flow of extracted information. At point 600, the extractor selects data from the storage table and provides the data to an interface, which may be an InfoSource within a BW system. At step 602, the InfoSource provides the data to at least two data targets, which may be an InfoCube and an analysis engine or ODS object. As shown at point 604, the InfoSource provides a full set of data statements to both the InfoCube and the analysis engine or ODS object. The data at 604 contains data statements 620 and 622 that have business metric values that exceed or, in the event of a minimum threshold, are below the given threshold.

Turning now to FIG. 7, an exemplary data table 700 is shown with data statements 702, 704, 706 and 708. Each data statement comprises an article number, a location, an inventory quantity, a record number, a day and a field indicating the extent to which a particular criterion was exceeded.

Returning now to FIG. 6, the analysis engine or ODS object at point 606 keeps the entire data set (shown at 608). The InfoCube, however, is provided with a filter active at point 614. The filter active at point 614 filters out all statements where the threshold is not exceeded or, in the event of a minimum threshold, not reached. For example, in the case of moving average price reporting, the filter will reject all statements where the absolute value of the difference between the current moving average price and the prior moving average price does not exceed a given value. The resulting data storage at 616 in the InfoCube has only data statements 624 and 626, which correspond to statements 620 and 622. This enhances the speed at which the InfoCube can perform exception reporting, while allowing more detailed analyses to be performed by means of the analysis engine or ODS object.

The InfoCube for the daily reporting can comprise, for example, only those statements for which the deviation of the prior metric from the newest metric exceed a threshold to be defined by a system user. The InfoCube contains relatively few data statements, thus facilitating high-performance reporting. The ODS object for the detailed analysis comprises all statements delivered by the extractor. This is preferred in case it is desirable to analyze, for an exceptional metric, all other documents for a day, to, for example, display the development of the metric over a certain time period.

Due to the potentially large volumes of information transmitted to the analysis engine, it is beneficial to precalculate report parameters at point 610 prior to reporting at 612. This alleviates the calculation burden associated with massive amounts of data and can improve the appearance of system performance to the user.

The user may receive an exception report at point 618. If the exception report warrants it, the user may view more detailed reporting at point 612. The more detailed reporting is based on all data passed to the InfoSource, and can thus show exceptions in context. The detailed reporting can, for example, show the change over time of the business metric.

The results of the analysis itself should provide, along with adequate information regarding evidence that lead to the alert values of the average moving price, information regarding the corresponding inventory elements, the inventory values and the average moving price.

What is claimed is:

1. A system for monitoring a data metric, comprising:
    a plurality of records relating to a data metric;
    a database for storing at least a portion of information from at least one of the plurality of records relating to a data metric;
    a first data storage unit;
    a second data storage unit;
    an extractor for querying the database for database data relevant to the data metric within a particular time frame and providing query results to the first data storage unit and the second data storage unit;
    wherein the second data storage unit is configured to store the provided query results;
    wherein the first data storage unit is configured to store at most a portion of the provided query results, the at most a portion of the provided query results corresponding to less than all of the query results stored at the second data storage unit; and
    wherein the first and second data storage units are used to generate first and second reports regarding the data metric.

2. The system of claim 1, wherein the database stores the at least a portion of information from at least one of the plurality of records relating to a data metric in rows, and wherein each row further comprises a time stamp relating to the time of the at least a portion of information.

3. The system of claim 2, wherein the extractor queries the database based for rows based on the time stamp of each row.

4. The system of claim 3, wherein the first data storage unit comprises a filter to reject at least a portion of the query results.

5. The system of claim 4, wherein the filter of the first data unit accepts only query results wherein a particular data value exceeds or is lower than a threshold value.

6. The system of claim 5, wherein the second data storage unit does not filter the query results.

7. The system of claim 6, further comprising an interface unit implemented between the extractor and the first data storage unit and the second data storage unit, such that the extractor provides query results to the first data unit and the second data unit through the interface unit.

8. The system of claim 7, wherein the first report comprises a list of query results wherein the particular data value exceeds or is lower than a threshold value; and wherein the second report provides the capability to view all available records relating to the data metric.

9. The system of claim 8, wherein the data metric is the moving average price of a good.

10. A method for allowing monitoring of a data metric, comprising:
    scanning a plurality of records to determine those related to a data metric;
    storing information from at least some of the plurality of records in a database;
    extracting, via a query, information from the database related to the data metric;
    providing the information to a first data storage unit and a second data storage unit
    storing at the second data storage unit the provided information;
    storing at the first data storage unit at most a portion of the provided information, the at most a portion of the provided information corresponding to less than all of the information stored at the second data storage unit;
    generating a report using the first data storage unit; and
    generating a report using the second data storage unit.

11. The method of claim 10, wherein the step of storing information from at least some of the plurality of records in a database further comprises storing the information in rows and associating each row with a time stamp relating to the time the information was stored.

12. The method of claim 11, wherein the step of extracting, via a query, information from the database related to the data metric further comprises querying the database for rows based on the time stamp of each row.

13. The method of claim 12, wherein the step of providing the query information to a first data storage unit and a second data storage unit further comprises blocking, via a filter in the first data storage unit, at least a portion of the query results from being provided to the first data storage unit.

14. The method of claim 13, wherein the step of blocking, via a filter in the first data storage unit, at least a portion of the query results from being provided to the first data storage unit comprises accepting only query results wherein a particular data value exceeds or is lower than a threshold value.

15. The method of claim 14, wherein the step of providing the query information to a first data storage unit and a second data storage unit further comprises storing, at the second data storage unit, all of the query results.

16. The method of claim 15, wherein the step of providing the query information to a first data storage unit and a second data storage unit further comprises providing the query results to the first data unit and the second data unit through an interface unit.

17. The method of claim 16, wherein the step of generating a report using the first data storage unit comprises generating a report including a list of query results wherein the particular data value exceeds or is lower than a threshold value; and wherein the step of generating a report using the second data storage unit comprises generating a report providing the capability to view all available records relating to the data metric.

18. The method of claim 17, wherein the data metric comprises the moving average price of a good.

19. A machine readable medium with executable program code embedded therein, the code when executed by a processor, performing a method, comprising:
    scanning a plurality of records to determine those related to a data metric;
    storing information from at least some of the plurality of records in a database;

extracting via a query information from the database related to the data metric;

providing the query information to a first data storage unit and a second data storage unit;

storing at the second data storage unit the provided information;

storing at the first data storage unit at most a portion of the provided information, the at most a portion of the provided information corresponding to less than all of the information stored at the second data storage unit;

generating a report using the first data storage unit; and generating a report using the second data storage unit.

20. The machine readable medium of claim 19, wherein the method step of providing the query information to a first data storage unit and a second data storage unit further comprises blocking, via a filter in the first data storage unit, at least a portion of the query results from being provided to the first data storage unit; and wherein the data metric comprises the moving average price of a good.

* * * * *